United States Patent
Vo et al.

(10) Patent No.: US 7,919,538 B2
(45) Date of Patent: Apr. 5, 2011

(54) STYRENE ACRYLONITRILE COPOLYMER FOAM WITH INFRARED ATTENUATING AGENTS

(75) Inventors: Chau V. Vo, Souffelweyersheim (FR); Lawrence S. Hood, Saginaw, MI (US)

(73) Assignee: Dow Global Technologies LLC, Midland, MI (US)

( * ) Notice: Subject to any disclaimer, the term of this patent is extended or adjusted under 35 U.S.C. 154(b) by 661 days.

(21) Appl. No.: 11/974,656

(22) Filed: Oct. 15, 2007

(65) Prior Publication Data

US 2008/0139682 A1 Jun. 12, 2008

Related U.S. Application Data

(60) Provisional application No. 60/873,797, filed on Dec. 6, 2006.

(51) Int. Cl.
*C08J 9/08* (2006.01)
*C08J 9/06* (2006.01)
*C08L 25/12* (2006.01)

(52) U.S. Cl. ............ 521/79; 521/81; 521/139; 521/146; 521/147; 264/53; 264/55

(58) Field of Classification Search ............ 521/79, 521/81, 139, 146, 147; 264/53, 55
See application file for complete search history.

(56) References Cited

U.S. PATENT DOCUMENTS

| | | | |
|---|---|---|---|
| 4,323,528 A | | 4/1982 | Collins |
| 4,795,763 A | | 1/1989 | Gluck et al. |
| 5,071,606 A | * | 12/1991 | Tusim et al. ............ 264/53 |
| 5,240,968 A | | 8/1993 | Paquet et al. |
| 5,373,026 A | | 12/1994 | Bartz et al. |
| 6,130,265 A | | 10/2000 | Glueck et al. |
| 6,521,672 B1 | | 2/2003 | Glueck et al. |

FOREIGN PATENT DOCUMENTS

| | | | |
|---|---|---|---|
| DE | 19637366 | * | 9/1996 |
| EP | 0372343 | | 6/1990 |
| EP | 0905176 | | 3/1999 |
| EP | 1031600 | | 4/2003 |
| EP | 1196486 | | 10/2003 |
| EP | 1479717 | * | 11/2004 |
| EP | 1661939 | | 5/2006 |
| JP | 2002 155161 A | | 5/2002 |
| WO | WO-94/13721 | | 6/1994 |
| WO | WO 02/81555 | | 10/2002 |
| WO | WO-2004/087798 | | 10/2004 |
| WO | WO 2006/108672 | | 10/2006 |

* cited by examiner

*Primary Examiner* — Irina S Zemel
(74) *Attorney, Agent, or Firm* — Steven W. Mork

(57) ABSTRACT

Polymer foam containing styrene-acrylonitrile and containing one or more infrared attenuating agents achieves surprisingly high dimensional integrity at elevated temperatures.

17 Claims, No Drawings

STYRENE ACRYLONITRILE COPOLYMER FOAM WITH INFRARED ATTENUATING AGENTS

CROSS REFERENCE STATEMENT

This application claims the benefit of U.S. Provisional Application No. 60/873,797, filed Dec. 6, 2006.

BACKGROUND OF THE INVENTION

1. Field of the Invention

The Present invention relates to a polymer foam comprising styrene acrylonitrile copolymer and one or more infrared attenuating agent such as carbon black and graphite. The invention further relates to a process for preparing such a foam.

2. Description of Related Art

Chlorinated blowing agents, particularly chlorofluorocarbon (CFC) and hydrochloroflubrocarbon (HCFC) blowing agents, have historically served two important roles in insulating polymer foam technology: as blowing agents and as thermal insulating components in polymer foam. However, concerns over how CFC and HCFC blowing agents affect the environment have led to regulations on their use. These regulations have motivated innovation of alternative means for enhancing the thermal insulating capability of polymer foam while using blowing agents other than chlorinated blowing agents.

Inclusion of infrared attenuating agents (IAA) into polymer foam has been one approach to enhance the thermal insulating capability of polymer foam apart from chlorinated blowing agents. IAAs can enhance thermal insulating capability by absorbing, reflecting or absorbing and reflecting infrared radiation. An IAA inhibits penetration of infrared radiation through a foam containing the IAA. There are, for example, numerous references disclosing examples of polystyrene foams containing carbon black and graphite as IAAs.

U.S. Pat. No. 4,795,763 ('763) teaches that carbon black is useful for incorporating into rigid foamed plastic materials to enhance thermal insulative properties of the foamed plastic material. '763 provides specific examples of polyisocyanurate foams and teaches that in the broadest aspects of the invention the plastic materials are polyurethane, polyisocyanurate, polyurea, polyolefin, polystyrene, phenol-formaldehyde, epoxy and other polymeric foams.

European patent (EP) 0372343 ('343) teaches that inclusion of carbon black into close celled foams of styrene polymers and copolymers can reduce the thermal conductivity of those foams. '343 provides specific examples of polystyrene foams containing carbon black.

Published patent application WO 94/13721 discloses a particularly beneficial form of carbon black for dispersing into polymeric foam and provides specific examples of polystyrene foams containing the carbon black.

EP 1196486 and EP 1031600 disclose styrene based polymer foams containing graphite particles. EP1661939 discloses styrene based polymer foams that can contain IAAs such as carbon black and graphite.

While these references disclose benefits of reducing thermal conductivity when incorporating carbon black or graphite into polymer foam, none of them address the effect of an IAA on dimensional integrity of a foam, particularly at elevated temperatures. Having a high dimensional integrity at elevated temperatures is important to ensure that an insulating foam will not change dimensions to any significant extent when used in high temperature insulating applications.

BRIEF SUMMARY OF THE INVENTION

Research leading to discovering the present invention has revealed that adding an IAA, such as carbon black or graphite, to polystyrene foam causes the foam to suffer a loss in dimensional integrity at elevated temperatures. It is desirable to find a polymer foam, particularly a thermoplastic polymer foam, that can benefit from the thermal insulating contribution of infrared attenuating agent (IAA) but that will retain dimensional integrity at elevated temperatures better than polystyrene.

The present invention provides a polymer foam containing an IAA that has an unexpectedly high dimensional integrity at elevated temperatures. The present invention is a result of exploring IAAs in combination with styrene acrylonitrile copolymer (SAN) foam. Experimentation revealed a surprising synergistic effect between SAN and the IAA that resulted in dimensional integrity of the foam at higher temperatures than expected in view of similar polystyrene foams. Surprisingly, incorporating IAA into an SAN foam, even an infrared absorbing IAA, resulted in an increased dimensional integrity at elevated temperatures. This is in contrast to PS foam, which shows a reduced dimensional integrity upon incorporation of IAA. The unexpected synergistic behavior of IAAs with SAN provides a thermally insulating polymer foam having particularly desirable dimensional integrity at elevated temperatures.

In a first aspect, the present invention is a polymer foam comprising a polymer composition having cells defined therein, the polymer composition containing styrene acrylonitrile polymer and an infrared attenuating agent. In desirable embodiments the polymer foam has one or any combination of the following characteristics: the infrared attenuating agent is selected from carbon blacks and graphites, the amount of infrared attenuating agent is between one and twenty weight-percent, the amount of acrylonitrile is one weight-percent or more and fifty weight-percent or less (more desirably four weight-percent or more and twenty weight-percent or less), the foam has an open cell content of 30% or less (according to ASTM method D6226-05), the foam has a density of 33 kilograms per cubic meter or less, the foam is free of bead skins, all polymer in the polymer composition have a weigh-averaged molecular weight of less than 1,000,000, the foam has a thermal conductivity of 32 milliwatts per meter-Kelvin or less, and the foam has a vertical compressive strength of 100 kilopascals or more (according test method ISO 845-95. Weight-percents are relative to total polymer composition weight.

In a second aspect, the present invention is a process for preparing the polymer foam of the first aspect, the process comprising forming a foamable composition containing a polymer composition containing styrene acrylonitrile copolymer and an infrared attenuating agent and expanding the foamable composition into a polymer foam. In desirable embodiments, the process includes one or any combination of the following characteristics: the infrared attenuating agent is selected from carbon blacks and graphites, the amount of infrared attenuating agent is between one and twenty weight-percent, the amount of acrylonitrile is one weight-percent or more and fifty weight-percent or less (more desirably four weight-percent or more and twenty weight-percent or less), the process is an extrusion process, and the foamable composition comprises a blowing agent containing carbon dioxide.

In a third aspect, the present invention is a method of using the polymer foam of the first aspect, the method comprising placing the polymer foam between two areas that can differ in temperature.

DETAILED DESCRIPTION OF THE INVENTION

Polymer Foam

In one aspect the present invention is a polymer foam comprising a polymer composition having cells defined therein. The polymer composition serves as a continuous polymer network around spaces (cells) that are free of polymer composition. The polymer composition occupies cell walls defining the cells.

The polymer composition contains styrene-acrylonitrile copolymer (SAN). The SAN can be either a block copolymer or a random copolymer. The polymer composition may contain additional polymers other than SAN, may consist essentially of SAN or may consist of SAN. A polymer composition will "consist essentially of SAN" if SAN is present as 90 percent by weight (wt %) or more, preferably 95 wt % or more based on the total weight of all polymers in the polymer composition (i.e., total polymer composition weight). The polymer composition may comprise a blend of SAN and another polymer, typically an alkenyl aromatic polymer or copolymer such as polystyrene (PS) homopolymer, copolymer or both. Desirably, more than 95 wt % of the polymers (based on total polymer weight), more desirably all of the polymers in the polymer composition are thermoplastic polymers.

Whether the polymer composition contains only SAN, or SAN with other polymers, the acrylonitrile (AN) component of the SAN is present at a concentration of one wt % or more, preferably four wt % or more, more preferably ten wt % or more based on the weight of all polymers in the polymer composition. The AN component of the SAN is desirably present at a concentration of fifty wt % or less, typically thirty wt % or less, even twenty wt % or less or 15 wt % or less based on the weight of all polymers in the polymer composition. When AN is present at a concentration of less than one wt %, the synergistic effect on dimensional integrity between SAN and carbon black is minimal, if detectable at all. When AN is present at a concentration greater than fifty wt %, the polymer composition is difficult to make into a polymer foam at desirable production rates due to high polymer viscosity.

Typically, the weight-averaged molecular weight (Mw) of the SAN and, desirably, any additionally polymer in the polymer foam is 40,000 or more, preferably 60,000 or more, more preferably, 75,000 or more. The Mw of the SAN and, desirably, any additional polymer in the polymer foam is generally 300,000 or less, preferably 250,000 or less, and more preferably 150,000 or less. Additionally, it is desirable for 90% or more, preferably all of the polymers in the polymer foam to have a Mw of less than 1,000,000. If the SAN Mw is too low the SAN has insufficient physical strength to provide foam integrity. If the SAN Mw is too high, the gel viscosity of the SAN is so high that it is difficult to foam, particularly at economically attractive rates. For the same reasons, Mw for any other polymer desirably falls in the specified Mw ranges.

The polymer foam can be open celled or close celled. An open celled foam has an open cell content of at least 30%. Desirably, the polymer foam is a closed cell foam (less than 30% open cell content), preferably a closed cell foam having 20% or less, more preferably 10% or less, even more preferably 5% or less, still more preferably 1% or less open cell content. Foam of the present invention may have 0% open cell content. Determine open cell content according to American Society for Testing and Materials (ASTM) method D6226-05. Close celled foams are more desirable than open celled foams because they are better thermal insulators. Close celled foam, however, typically suffers from lower dimensional integrity at elevated temperatures than open cell foams, presumably because pressure build-up in the cells promotes dimensional changes in the foam (see, e.g., U.S. Pat. No. 5,557,896). Surprisingly, even close celled foams of the present invention demonstrate attractive dimensional integrity at elevated temperatures concomitant with a low thermal conductivity.

The polymer foam can have essentially any density. Lower densities are desirable because they correspond to less polymer composition mass in a given cross section of the polymer foam, which typically corresponds to a lower thermal conductivity through the polymer foam. Therefore, it is desirable for the polymer foam to have a density of 64 kilograms per cubic meter ($kg/m^3$) or less, preferably 40 $kg/m^3$ or less, more preferably 36 $kg/m^3$ or less, still more preferably 33 $kg/m^3$ or less. Generally, the polymer foam will have a density of 10 $kg/m^3$ or more, more typically 16 $kg/m^3$ or more in order to ensure that the foam has mechanical strength. Measure polymer foam density using ISO method 845-85.

Infrared attenuating agents (IAA) for use in the present polymer foam include any additive that attenuate infrared radiation penetration through foam, typically by absorbing, reflecting or both absorbing and reflecting infrared radiation. Examples of suitable IAAs include carbon black (all kinds), graphite, titanium dioxide and metal flecks and flakes. Infrared absorbing IAAs (e.g., carbon black and graphite) increase a foam's temperature when they absorb infrared radiation, thereby facilitating dimensional instability of the polymer foam. Therefore, infrared absorbing IAAs can be problematic in a polymer foam at elevated temperatures (or in the presence of infrared radiation in general).

Surprisingly, foams of the present invention demonstrate dimensional integrity at elevated temperatures even when they include infrared absorbing IAAs. Carbon black and graphite are the most desirable IAAs for use in the present invention. Graphite can be of any type, including natural and synthetic, expanded and expandable graphite. Carbon black can also be of any type including furnace black, thermal black, and lamp black. Carbon black and graphite can be present together in the polymer foam. Alternatively, the polymer foam contains either carbon black or graphite. Suitable types of carbon black and graphite for use in the present invention include:

| Type | Supplier | Product Name | Particle Size |
|---|---|---|---|
| Furnace Black | Degussa | Panther 17 | 26 nanometers (nm) |
| Furnace Black | Degussa | Arosperse 7 | 62 nm |
| Furnace Black | Degussa | Arosperse 60 | 91 nm |
| Lamp Black | Degussa | Lamp Black 101 | 95 nm |
| F Thermal Black | Asahi Carbon | Fine Thermal | 80 nm |
| Thermal Black | Degussa | Arosperse 15 | 290 nm |
| Thermal Black | Columbian Chemical | Sevacarb MT-LS | 300 nm |
| Graphite natural | Timcal, Imerys | Timrex ®* GA 98/10 | 10 micrometers (µm) |

-continued

| Type | Supplier | Product Name | Particle Size |
|---|---|---|---|
| Graphite natural | Clariant | SL90025506 | 6.4 μm |
| Graphite natural | Graphite Sales Inc. | FP-428 | 10.5 μm |
| Graphite synthetic | Graphite Sales Inc. | FP-165 | 12 μm |
| Graphite ultrafine | Graphit Kropfmuehl Ag | UF1 98 C | 3 μm |
| Graphite ultrafine | Graphit Kropfmuehl Ag | UF2 98 | 4.5 μm |

*Timrex is a trademark of the Timcal SA Corporation

IAAs are generally present at a concentration of from 0.1 wt % to 20 wt %, preferably 0.2 wt % or more, more preferably 0.5 wt % or more, still more preferably 1 wt % or more and typically 15 wt % or less, more typically 10 wt % or less, and can be present at a concentration of 5 wt % or less. Determine wt % of IAA based on total polymer weight in a foam.

Additional additives may also be present in the polymer foam. Additional additives include clays such as natural absorbent clays (e.g., kaolinite and montmorillonite) and synthetic clays; nucleating agents (e.g., talc and magnesium silicate); flame retardants (e.g., brominated flame retardants such as hexabromocyclododecane, phosphorous flame retardants such as triphenylphosphate, and flame retardant packages that may including synergists such as, or example, dicumyl and polycumyl); lubricants (e.g., calcium stearate and barium stearate); and acid scavengers (e.g., magnesium oxide and tetrasodium pyrophosphate). A preferred flame retardant package includes a combination of hexahalocyclododecane (e.g., hexabromocyclododecane) and tetrabromobisphenol A bis(2,3-dibromopropyl ether. Additional additives may account for up to 10 wt % of the foam's total weight.

Polymer foam of the present invention has a low thermal conductivity which makes it particularly useful as a thermal insulating material. Foams of the present invention can demonstrate thermal conductivity values of 32 milliwatts per meter-Kelvin (mW/m*K) or less, preferably 31 mW/m*K or less, even more preferably 30 mW/m*K or less. Measure thermal conductivity according to method EN 8301.

Thermally insulating foams inhibit heat (i.e., thermal energy) from traveling through them. As such, they are useful as barriers between two areas to inhibit heat transfer from one of the areas to the other. In some instances, the warmer area (one with more thermal energy) can approach or exceed temperatures of 100° C. It is desirable to be able to use a polymeric foam to thermally insulate those areas from other areas without sacrificing mechanical properties of the foam. One mechanical property of polymeric foams that tends to suffer at elevated temperatures is dimensional integrity. Polymer foams of the present invention retain dimensional integrity at unexpectedly high temperatures, even up to and exceeding 100° C.

Dimensional integrity is a measure of how extensively a foam changes in dimensions. Polymer foam has three mutually perpendicular dimensions: length, width and thickness. The length and width define a primary surface of the foam, which is a surface having the highest planar surface area. Planar surface area is an area projected onto a plane (i.e., the area defined by a foam length and width without accounting for peaks and valleys within that area). The primary surface of a foam has an opposing surface that has either an equal planar surface area (i.e., also qualifies as a primary surface) or a lower planar surface area. Desirably, a primary surface and the surface opposing the primary surface are approximately (or about) parallel, or parallel. The foam thickness corresponds to the distance from a primary surface to its opposing surface extending perpendicularly from the primary surface. The thickness may differ at different points on the primary surface. Desirably, the thickness of a foam differs by 10% or less, preferably 5% or less at any point on a primary surface.

Measure dimensional integrity as a measure of volumetric change in the course of a Dimensional Integrity Test (DIT). Carry out a DIT by cutting a foam sample (12.7 centimeters (cm) (5 inches) thick, 10.2 cm (4 inches) wide and approximately 2.54 cm (1 inch) thick), placing the foam sample in an oven at a specific temperature for one to three hours and then removing it from the oven. Measure the height, width and thickness of the foam sample prior to placing in the oven and again after removing from it the oven in order to calculate the foam sample's volume before and after going into the oven. Determine volumetric change by dividing the volume after oven treatment by the volume prior to oven treatment and multiplying by 100%. Use a new foam sample for each oven temperature. Dimensional integrity at elevated temperatures is desirable. Therefore, a small volumetric change in a foam sample is desirable, particularly as the temperature of the oven gets higher.

Polymer foams of the present invention (comprising SAN and containing an IAA) surprisingly demonstrate higher dimensional integrity (lower volumetric change) at temperatures of 80° C. or more, and can show higher dimensional integrity at temperatures of 90° C. or more, even 95° C. or more relative to similar foams without the IAA. In particular, polymer foams of the present invention desirably demonstrate 5% change in volume or less at a temperature of 80° C. or higher, preferably at 85° C. or higher, more preferably at 90° C. or higher, still more preferably at 100° C. or higher. Even more desirable embodiments of polymer foams of the present invention have an open cell content of less than 30%, preferably 20% or less, more preferably 10% or less, still more preferably 5% or less and most-preferably 1% or less while demonstrating 5% change in volume or less at a temperature of 80° C. or higher, preferably at 85° C. or higher, more preferably at 90° C. or higher, still more preferably 100° C. or higher. Measure change in volume according to a DIT.

In contrast to the foams of the present invention, addition of IAA to polystyrene foams actually tends to cause the foam to lose dimensional integrity, or at best remain unchanged in dimensional integrity, at elevated temperatures. (see Comparative Examples A and B, below).

Desirable embodiments of the foam of the present invention further demonstrate vertical compressive strengths of 100 kilopascals (kpa) or more, preferably 200 kPa or more, more preferably 300 kPa or more, still more preferably 400 kPa or more. Measure vertical compressive strength according to method ISO 845-95. Vertical compressive strength is desirable in applications where the polymer foam may experience pressure against its primary surface, or surface opposing the primary surface, or both. Such applications include roofing applications and road sub-structure applications. Higher vertical compressive strengths indicate that the polymer foam can bear more pressure before deforming.

Foams of the present invention generally have an average cell size of 0.5 millimeters (mm) or less, preferably 0.3 mm or less, more preferably 0.25 mm or less and 0.05 mm or more, preferably 0.1 mm or more, more preferably 0.2 mm or more. Determine average cell size according to ASTM method D-3576. Foams of the present invention further can have a monomodal (that is, unimodal) cell size distribution or a multimodal cell size distribution (including bimodal). A foam has a multimodal cell size distribution if a plot of number of cells versus cell size (rounded to nearest 0.01 millimeters) reveals more than one peak (local maximum of two or more points). A monomodal or unimodal cell size distribution if such a plot reveals only one peak. Measure at least 100 cells to establish a plot for determining whether a foam is multimodal or not.

Process

Virtually any foaming process suitable for preparing thermoplastic foam is suitable for preparing foams of the present invention. In general, prepare foams of the present invention by forming a foamable composition containing a polymer composition, preferably a thermoplastic polymer composition, comprising SAN and an IAA (the SAN and IAA are as described above for the polymer foam) and expanding the foamable composition into a polymer foam. Foamable compositions typically comprise a polymer composition and a blowing agent together at a pre-expansion pressure. Expand a foamable composition by exposing it to a pressure lower than pre-expansion pressure. Specific foaming processes that are suitable include expandable bead foam processes, accumulative foaming processes and extrusion processes.

In an expandable foam bead process prepare a foamable composition by incorporating a blowing agent into granules of polymer composition (e.g., imbibing granules of polymer composition with a blowing agent under pressure). The polymer composition comprises the SAN and IAA. Subsequently, expand the granules in a mold to obtain a foam composition comprising a multitude of expanded foam beads (granules) that adhere to one another to form a "bead foam". The granules can experience some level of foaming prior to expansion within a mold to form a bead foam. Bead foam has a characteristic continuous network of polymer skin corresponding to the surface of each individual bead extending throughout the foam.

Accumulative foaming processes comprise: 1) mixing a thermoplastic material and a blowing agent composition to form a foamable polymer composition; 2) extruding the foamable polymer composition into a holding zone maintained at a temperature and pressure which does not allow the foamable polymer composition to foam; the holding zone has a die defining an orifice opening into a zone of lower pressure at which the foamable polymer composition foams and an openable gate closing the die orifice; 3) periodically opening the gate while substantially concurrently applying mechanical pressure by means of a movable ram on the foamable polymer composition to eject it from the holding zone through the die orifice into the zone of lower pressure, and 4) allowing the ejected foamable polymer composition to expand to form the foam. U.S. Pat. No. 4,323,528, herein incorporated by reference, discloses such a process in a context of making polyolefin foams.

Extrusion processes are most desirable. Extrusion processes are continuous as opposed to semi-continuous or batch, as is the case with accumulative foaming. A continuous process is a more efficient means of producing polymer foam. An extrusion process also produces foam that is free from having a continuous skin network throughout the foam, as is present in foams from an expandable bead foam processes. Foams made from expandable foam bead processes have a network of polymer skins (bead skins) that define groups of cells within the foam. Such skins are residual skins from each foam bead that expanded to form the foam. The bead skins coalesce together to form a foam structure comprising multiple expanded foam beads. Bead foams tend to be more friable than extruded foam because they can fracture along the bead skin network. Extruded foams are free from having the network of bead skins characteristic of expanded bead foam.

In an extrusion process prepare a foamable composition by mixing a polymer composition comprising SAN and the IAA (preferably carbon black, graphite or both) in an extruder at a temperature sufficiently high to soften the polymer composition, and then mixing in a blowing agent at an addition pressure sufficient to preclude appreciable expansion of the polymer composition. It is acceptable to either feed the IAA directly into the extruder or to pre-mix the IAA with a polymer prior to addition to an extruder (i.e., compound it or create a masterbatch). It is desirable to then cool the foamable composition to a foaming temperature and then expel the foamable composition through a die into an environment of lower pressure than the addition pressure. As the foamable composition enters the environment of lower pressure it expands into a polymer foam.

Blowing agents are typically present in a combined concentration of 0.001 mole per 100 grams of polymer to 0.5 mole per 100 gram of polymer. Suitable blowing agents for use in an extrusion foaming process include one or more of the following: inorganic gases such as carbon dioxide, argon, nitrogen, and air; organic blowing agents such as water, aliphatic and cyclic hydrocarbons having from one to nine carbons including methane, ethane, propane, n-butane, isobutane, n-pentane, isopentane, neopentane, cyclobutane, and cyclopentane; fully and partially halogenated aliphatic hydrocarbons having from one to five carbons, preferably that are chlorine-free (e.g., difluoromethane (HFC-32), perfluoromethane, ethyl fluoride (HFC-161), 1,1,-difluoroethane (HFC-152a), 1,1,1-trifluoroethane (HFC-143a), 1,1,2,2-tetrafluoroethane (HFC-134), 1,1,1,2 tetrafluoroethane (HFC-134a), pentafluoroethane (HFC-125), perfluoroethane, 2,2-difluoropropane (HFC-272fb), 1,1,1-trifluoropropane (HFC-263fb), 1,1,1,2,3,3,3-heptafluoropropane (HFC-227ea), 1,1,1,3,3-pentafluoropropane (HFC-245fa), and 1,1,1,3,3-pentafluorobutane (HFC-365mfc)); aliphatic alcohols having from one to five carbons such as methanol, ethanol, n-propanol, and isopropanol; carbonyl containing compounds such as acetone, 2-butanone, and acetaldehyde; ether containing compounds such as dimethyl ether, diethyl ether, methyl ethyl ether; carboxylate compounds such as methyl formate, methyl acetate, ethyl acetate; carboxylic acid and chemical blowing agents such as azodicarbonamide, azodiisobutyronitrile, benzenesulfo-hydrazide, 4,4-oxybenzene sulfonyl semi-carbazide, p-toluene sulfonyl semi-carbazide, barium azodicarboxylate, N,N'-dimethyl-N,N'-dinitrosoterephthalamide, trihydrazino triazine and sodium bicarbonate.

The blowing agent is desirably free of CFC and HCFC blowing agents, preferably free of any chlorinated blowing agents. The blowing agent may be free of fluorinated blowing agents, and may be free of any halogenated blowing agents. The present process is particularly well suited for use with carbon dioxide as a blowing agent, either alone or in combination with another blowing agent.

The polymer composition and IAA in the foamable composition are as described for the polymer foam, above. Similarly, the foamable composition may further contain one or more additional additives as described for the foam of the present invention. Concentration ranges and types of polymer composition, IAA and additional additives for the polymer foam of the present invention apply to the present process in order to achieve the foam of the present invention (e.g., concentrations relative to total polymer weight in foam correspond to total polymer weight in foamable composition for the process and concentrations relative to total foam weight correspond to total foamable composition weight for the process).

The dimensional integrity of the present polymeric foam at elevated temperatures allows use of steam to conduct a secondary expansion to lower the foam's density without collapsing the foam. To steam expand a foam expose it to steam for a certain period of time. Steam expansion is beneficial to achieve lower densities than readily achievable by direct extrusion (i.e., 23 kg/m$^3$ or less, 20 kg/m$^3$ or less, even 19 kg/m³ or less). Even at these low densities foams of the present invention can achieve thermal conductivity values of 33 mW/m*k or lower.

Use

Polymer foam of the present invention is particularly well suited for use as an insulating material. In that regard, place a polymer foam of the present invention between two areas that can differ in temperature. The polymer foam of the present invention serves as a thermal insulating barrier between the two areas. Polymeric foam of the present invention is particularly well suited as a thermal insulating material where the thermal insulating material experiences temperatures (e.g., use or service temperatures) of 85° C. or higher, even 90° C. or higher, even 95° C. or higher, or 100° C. or higher. The dimensional integrity of the present polymeric foam at these temperatures allows the foam to remain mechanically sound at such high use or service temperatures.

EXAMPLES

Comparative Example (Comp Ex) $A_0$-$A_2$

PS Foam with Furnace Black

Prepare a polymer blend by dry blending 100 weight-parts polystyrene (192,000 Mw with a polydispersity of about 2.3); carbon black concentrate (30 wt % furnace black in polystyrene; e.g., Raven® 430 from Columbian Chemicals Company; Raven is a trademark of the Columbian Chemicals Company); 0.7 weight-parts hexabromocyclododecane; 0.1 weight-parts of talc, and 0.1 weight parts of calcium stearate.

Table 1 identifies how much carbon black is in each Comp Ex $A_0$-$A_2$. Add sufficient carbon black concentrate to achieve the appropriate carbon black concentration.

Meter the polymer blend into a single screw extruder, mix and melt it at a temperature of 200-220° C. Add to the mixed and melted polymer 12.3-12.8 weight parts of a blowing agent composition consisting of 70-73 wt % HCFC-142b, 20 wt % ethyl chloride and 7-10 wt % carbon dioxide (wt % based on blowing agent composition weight) to form a foamable gel. Add the blowing agent composition under sufficient pressure above atmospheric pressure so as to preclude expansion of the foamable gel. Cool the foamable gel to 115-125° C. and extrude through a slit die into atmospheric pressure to form a rectangular foam board.

For Comp Ex $A_2$, steam expand a sample containing 7 wt % carbon black to achieve a density of 34.6 kg/m³.

Let each foam age for 20 days and subject to a Dimensional Integrity Test at temperatures of 74° C. (1650 Fahrenheit (F)), 77° C. (170° F.), 79° C. (175° F.), 82° C. (180° F.) and 85° C. (185° F.). Table 1 reports the volumetric change for each of Comp Ex $A_0$-$A_2$.

Comparative Example (Comp Ex) $B_0$-$B_2$

PS Foam with Thermal Black

Prepare a polymer blend by dry blending 100 weight-parts polystyrene (192,000 Mw with a polydispersity of about 2.3); a thermal black concentrate (50 wt % thermal black in polystyrene; e.g. Arosperse 15 from Degussa); 0.9 weight-parts hexabromocyclododecane; 0.1 weight-parts of talc; 0.08 weight-parts calcium stearate; and 0.3 weight-parts linear low density polyethylene.

Table 2 identifies how much thermal black is in each of Comp Ex $B_0$-$B_2$. Add sufficient thermal black concentrate to achieve the appropriate thermal black concentration.

Meter the polymer blend into a single screw extruder, mix and melt it at a temperature of 200-220° C. Add to the mixed and melted polymer 12.3-12.8 weight parts of a blowing agent composition consisting of 71-73 wt % HCFC-142b, 20 wt % ethyl chloride and 5-9 wt % carbon dioxide (wt % based on blowing agent composition weight) to form a foamable gel. Add the blowing agent composition under sufficient pressure above atmospheric pressure so as to preclude expansion of the foamable gel. Cool the foamable gel to 116-120° C. and extrude through a slit die into atmospheric pressure to form a rectangular foam board.

For Comp Ex $B_2$, steam expand a sample containing 7 wt % carbon black to achieve a density of 27.7 kg/m³.

Let each foam age for 21 days and subject to a Dimensional Integrity Test at temperatures of 71° C. (160° F.), 77° C. (170° F.), and 82° C. (180° F.). The volumetric change for each of Comp Ex $B_0$-$B_2$ is in Table 2.

TABLE 2

| Comp Ex | Concentration of Thermal Black (wt % based on total polymer weight) | Open Cell Content (%) | Foam Density (kg/m³) | Percent Volume Change at Temperature | | |
|---|---|---|---|---|---|---|
| | | | | 71° C. | 77° C. | 82° C. |
| $B_0$ | 0 | 0 | 31.2 | 2 | 4 | 12 |
| $B_1$ | 7 | 1 | 37.3 | 2 | 5 | 18 |
| $B_2$ | 7 | 0 | 27.7 | 2 | 4 | 18 |

Comp Exs A and B illustrate the following: (1) Addition of IAA reduces the dimensional integrity of a PS foam at temperatures above about 80° C.; and (2) All PS foams demonstrate greater than 5% volumetric change at temperatures above 80° C.

Comparative Example (Comp Ex) C

SAN Foam without IAA

Prepare a polymer blend by dry blending 70 weight-parts of SAN A (15 wt % AN, Mw=158,000) and 30 weight-parts

TABLE 1

| Comp Ex | Concentration of Carbon Black (wt % based on total polymer weight) | Open Cell Content (%) | Foam Density (kg/m³) | Percent Volume Change at Temperature | | | | |
|---|---|---|---|---|---|---|---|---|
| | | | | 74° C. | 77° C. | 79° C. | 82° C. | 85° C. |
| $A_0$ | 0 | 0 | 29.6 | 2 | 4 | 6 | 12 | 22 |
| $A_1$ | 7 | 0 | 37.6 | 2 | 5 | 6 | 18 | 37 |
| $A_2$ | 7 | 0 | 34.6 | 2 | 4 | 6 | 18 | 32 |

SAN B (15 wt % AN, Mw=114,000), 0.1 parts tetrasodium pyrophosphate (TSPP) and 0.24 parts barium stearate and 1.1 weight-parts of hexabromocyclododecane.

Feed the polymer blend into an extruder. Melt blend the polymer blend at a temperature of 200-220° C. Add 6.0 weight-parts per hundred parts SAN of a blowing agent composition consisting of 55 wt % carbon dioxide, 25 wt % water and 20 wt % isobutane to form a foamable gel. Wt % is based on total weight of blowing agent composition. Add the blowing agent composition under sufficient pressure above atmospheric pressure so as to preclude expansion of the foamable gel. Cool the foamable gel to 133° C. and extrude through a slit die into atmospheric pressure to form a rectangular board (Comp Ex C). Comp Ex C is an SAN foam that contains no IAA. Allow Comp Ex C to age for 30 days and then subject it to a Dimensional Integrity Test at temperatures of 86° C., 92° C., 95° C., 98° C. and 101° C.

Table 3 discloses the physical properties of Comp Ex C and the results of the Dimensional Integrity Test for Comp Ex C.

Example (Ex) 1

SAN Foam with Graphite

Prepare Ex 1 in the same manner as Comp Ex C except include in the polymer blend 4 weight-parts of graphite concentrate (a blend of 50 wt % graphite and 50 wt % polystyrene, available under the name Cesa-conductive SL90025506 from Clariant). Ex 1 contains 2 wt % graphite based on polymer blend weight. Subject Ex 1 to a Dimensional Integrity Test in the same manner as Comp Ex C.

Table 3 discloses the physical properties of Ex 1 and the Dimensional Integrity Test results for Ex 1.

Ex 2

SAN Foam with Carbon Black

Prepare Ex 2 in the same manner as Comp Ex C except include in the polymer blend 8 weight-parts of a carbon black concentrate (50 wt % thermal black (e.g., Arosperse-15 from Degussa) and 50 wt % polyethylene (1.8 melt index, e.g., PE-620i available from The Dow Chemical Company)). Ex 2 contains 4 wt % thermal black based on polymer blend weight. Subject Ex 2 to a Dimensional Integrity Test in the same manner as Comp Ex C.

Table 3 discloses the physical properties of Ex 2 and the Dimensional Integrity Test results for Ex 2.

Ex 3

Steam Expanded SAN Foam with Graphite

Prepare a foam equivalent to Ex 1 and then steam the foam to further reduce the foam density to 23.4 kg/m$^3$. Table 3 discloses the physical properties of Ex 3.

TABLE 3

|  | Comp Ex C | Ex 1 | Ex 2 | Ex 3 |
| --- | --- | --- | --- | --- |
| IAA | none | 2 wt % graphite | 4 wt % thermal black | 2 wt % graphite |
| Thickness (mm) | 30 | 21 | 22 | 17 |
| Density without skin (kg/m$^3$) | 28.1 | 32.7 | 29.8 | 23.4 |
| Cell Size (mm) | 0.34 | 0.11 | 0.28 | 0.11 |
| Open Cell Content (%) | Less than 20 | Less than 20 | Less than 20 | Less than 20 |
| Vertical Compressive Strength (kPa) | 311 | 400 | 261 | 143 |
| Long-term thermal conductivity (mW/m * K) | 32.6 | 30 | 32 | 32.6 |
| % Volume Change in DIT at 86° C. | 1.7 | 0.2 | 0.7 | Not Measured |
| % Volume Change in DIT at 92° C. | 2.1 | 1.1 | 0.6 | Not Measured |
| % Volume Change in DIT at 95° C. | 2.3 | 0.8 | 1.2 | Not Measured |
| % Volume Change in DIT at 98° C. | 7.3 | 0.5 | 1.2 | Not Measured |
| % Volume Change in DIT at 101° C. | Not Measured | 8.7 | 2.7 | Not Measured |

Comp Ex C, Ex 1 and Ex 2 illustrate that inclusion of graphite or carbon black enhances the dimensional integrity of an SAN foam at elevated temperatures. Ex 1 and Ex 2 demonstrate less volumetric change at each of the test temperatures in the Dimensional Integrity Test than Comp Ex C. The primary difference between the examples and the comparative example is the presence of the IAA.

Ex 1 and Ex 2 further illustrate that SAN foams with IAA demonstrate dramatically greater dimensional integrity at elevated temperatures than PS foam either with or without IAA (compare data from Tables 1, 2 and 3).

Ex 3 illustrates an example of the present invention that has successfully been steam expanded to form a lower density foam of the present invention.

These Examples and Comparative Examples provide illustrations with a halogen-free blowing agent.

Comp Ex D

SAN Foam Using HFC-134a without IAA

Prepare a polymer blend by dry blending 50 weight-parts of SAN A (15 wt % AN, Mw of 144,000) and 50 weight-parts SAN B (15 wt % AN, Mw of 118,000), 0.95 weight-parts hexabromocyclododecane and 0.55 weight parts per hundred (pph) of an additive package comprising 0.15 pph barium stearate, 0.3 pph polyethylene and 0.10 pph talc, with pph based on 100 weight parts of polymer.

Feed the polymer blend into an extruder. Melt blend the polymer blend at a temperature of 200-220° C. Add 9.5 weight-parts per hundred weight-parts polymer blend of a blowing agent composition consisting of 16 wt % carbon dioxide, 10 wt % water and 74 wt % 1,1,1,2-tetrafluoroethane (HFC-134a) to form a foamable gel. Wt % is based on total weight of blowing agent composition. Add the blowing agent composition under sufficient pressure above atmospheric pressure so as to preclude expansion of the foamable gel. Cool the foamable gel to 129° C. and extrude through a slit die into atmospheric pressure to allow it to expand into a rectangular board (Comp Ex D). Comp Ex D is an SAN foam that contains no IAA. Allow Comp Ex D to age for 21 days and then subject it to a DIT at temperatures of 74° C., 79° C., 85° C., 91° C. and 96° C.

Table 4 discloses the physical properties and results from the DIT for Comp Ex D.

Ex 4

SAN Foam Using HFC-134a with IAA (Thermal Black)

Repeat Comp Ex D except add 8 wt % of thermal black concentrate (e.g., 50% Arosperse-15 from Degussa in polystyrene) to the extruder while melt blending the polymer blend in order to obtain Ex 4.

Subject Ex 4 to the same DIT as Comp Ex D. Table 4 discloses physical properties and DIT results for Ex 4.

TABLE 4

|  | Comp Ex D | Ex 4 |
|---|---|---|
| IAA | none | 4 wt % thermal black |
| Thickness (mm) | 25 | 25 |
| Density (kg/m³) | 32.0 | 34.1 |
| Cell Size (mm) | 0.28 | 0.26 |
| Open Cell Content (%) | 3.3 | 2.5 |
| Vertical Compressive Strength (kPa) | 282 | 270 |
| % Volume Change in DIT at 74° C. | 0.6 | 0.2 |
| % Volume Change in DIT at 79° C. | 1.3 | 0.1 |
| % Volume Change in DIT at 85° C. | 2.7 | 0.8 |
| % Volume Change in DIT at 91° C. | 5.9 | 1.0 |
| % Volume Change in DIT at 96° C. | 14.8 | 6.9 |

A comparison of the data in Table 4 for Comp Ex D and Ex 4 provides another illustration of the synergistic effect of IAA with SAN in achieving higher-dimensional integrity at elevated temperatures. This illustration includes the presence of fluorinated blowing agent in the foam.

Ex 5

SAN/PS Blend Foam with Graphite

Prepare a polymer blend by dry blending 80 weight-parts of SAN A (15 wt % AN) and 20 weight-parts polystyrene, 0.1 parts tetrasodium pyrophosphate (TSPP) and 0.24 parts barium stearate and 1.1 weight-parts of hexabromocyclododecane. The total AN concentration is about 12 wt % of the total weight of polymer. Add to the polymer blend 0.6 weight-parts of graphite concentrate (a blend of 50 wt % graphite and 50 wt % polystyrene, available under the name Cesa™-conductive SL90025506 from Clariant) to achieve a graphite concentration of 0.3 wt % based on polymer weight.

Feed the polymer blend into an extruder. Melt blend the polymer blend at a temperature of 200-220° C. Add 6.6 weight-parts per hundred parts polymer of a blowing agent composition consisting of 52 wt % carbon dioxide, 18 wt % water and 30 wt % isobutane to form a foamable gel. Wt % is based on total weight of blowing agent composition. Add the blowing agent composition under sufficient pressure above atmospheric pressure so as to preclude expansion of the foamable gel. Cool the foamable gel to 133° C. and extrude through a slit die into atmospheric pressure to form a rectangular board (Ex 5). Ex 5 is an SAN/PS foam that contains 0.3 wt % graphite. Allow Ex 5 to age for 30 days and then subject it to a Dimensional Integrity Test at temperatures of 82° C., 91° C., 94° C., 97° C. and 100° C.

Table 5 discloses the physical properties of Ex 5 and Dimensional Integrity Test results for Ex 5.

Ex 6

SAN/PS Blend Foam with Graphite

Repeat Ex 5 but with 4 wt % of the graphite concentrate to achieve a foam with 2 wt % graphite based on polymer weight. Table 5 discloses the physical properties of Ex 6 and the Dimensional Integrity Test results for Ex 6.

TABLE 5

|  | Example 5 | Example 6 |
|---|---|---|
| IAA | 0.3 wt % graphite | 2 wt % graphite |
| Thickness (mm) | 20 | 17 |
| Density without skin (kg/m³) | 27.0 | 29.9 |
| Cell Size (mm) | 0.15 | 0.11 |
| Open Cell Content (%) | 0.9 | 19 |
| Vertical Compressive Strength (kPa) | 354 | 382 |
| Long-term thermal conductivity (mW/m * K) | 32.0 | 31.3 |
| % Volume Change in DIT at 82° C. | 0.4 | −0.1 |
| % Volume Change in DIT at 91° C. | −0.1 | 0.7 |
| % Volume Change in DIT at 94° C. | 01.2 | 0.1 |
| % Volume Change in DIT at 97° C. | 2.5 | 0.7 |
| % Volume Change in DIT at 100° C. | 2.2 | 1.6 |

Examples 4 and 5 illustrate foams of the present invention comprising a blend of SAN and polystyrene with an AN content of about 12 wt % based on polymer weight and containing graphite. Notably, both Exs 5 and 6 demonstrate less than 5% volume change in the DIT at temperatures over 80° C., even at 100° C.

Comp Ex E

4.1 wt % AN without Infrared Attenuating Agent

Prepare a polymer blend by dry blending 15 weight-parts of SAN (27 wt % AN, Mw of 83,000) and 85 weight-parts polystyrene (145,000 Mw and 3.4 polydispersity), 0.24 pph barium stearate, 0.4 pph copper blue concentrate, 0.4 pph linear low density polyethylene, with pph based on 100 weight parts of polymer.

Feed the polymer blend into an extruder. Melt blend the polymer blend at a temperature of 200° C. Add 5.9 weight-parts per hundred weight-parts polymer blend of a blowing agent composition consisting of 59 wt % carbon dioxide, 26 wt % iso-butane and 15 wt % water to form a foamable gel. Wt % is based on total weight of blowing agent composition. Add the blowing agent composition under sufficient pressure above atmospheric pressure so as to preclude expansion of the foamable gel. Cool the foamable gel to 125° C. and extrude through a slit die into atmospheric pressure to allow it to expand into a rectangular board (Comp Ex E). Comp Ex E is an SAN foam that contains 4.1 wt % AN relative to polymer weight and no IAA. Allow Comp Ex E to age for 21 days and then subject it to a DIT at temperatures of 83° C., 86° C., 89° C., 92° C. and 95° C.

Table 6 discloses the physical properties and results from the DIT for Comp Ex E.

TABLE 6

|  | Comp Ex E | Ex 7 | Ex 8 | Ex 9 | Ex 10 | Ex 11 |
|---|---|---|---|---|---|---|
| IAA | None | 2 wt % carbon black | 4 wt % carbon black | 3 wt % carbon black and 0.5 wt % UF-1 graphite | 1 wt % carbon black and 1.5 wt % UF-1 graphite | 2 wt % Timrex 98/1-graphite |
| Thickness (mm) | 25 | 27 | 24 | 27 | 24 | 23 |
| Density without skin (kg/m³) | 29.9 | 32.4 | 34.1 | 34.9 | 36.7 | 37.9 |
| Cell Size (mm) | 0.27 | 0.32 | .19 | 0.18 | .34 | .11 |
| Open Cell Content (%) | 0.3 | 1.4 | 0. | 9.5 | 0.1 | 19.2 |
| Vertical Compressive Strength (kPa) | 407 | 538 | 531 | 554 | 482 | 493 |
| Long-term thermal conductivity (mW/m * K) | 33.1 | 30.7 | 29.2 | 31.1 | 31.2 | 29.6 |
| % Volume Change in DIT at 83° C. | 0.6 | 0.3 | 0.4 | 0.2 | 0.3 | 0.2 |
| % Volume Change in DIT at 86° C. | NM* | 0.6 | 1.1 | 0.7 | NM* | NM* |
| % Volume Change in DIT at 89° C. | 2.5 | 2.9 | 2.7 | 2.1 | −0.1 | 0.4 |
| % Volume Change in DIT at 92° C. | 6.4 | 4.2 | 4.1 | 5.8 | 0.3 | 1.7 |
| % Volume Change in DIT at 95° C. | 15 | 7.8 | 11 | 7.3 | −0.4 | 2.7 |

*NM means non measured

Ex 7-11

4% AN Foam with Infrared Attenuating Agents

Prepare Examples 7-11 in a manner similar to Comp Ex E, with the following changes:

Ex 7: Use 5.1 pph blowing agent consisting of 59 wt % carbon dioxide, 29 wt % iso-butane and 12 wt % water; use 0.15 pph barium stearate and no copper-blue concentrate; and as an infrared attenuator include 2 pph carbon black (THERMAX™ N991, THERMAX is a trademark of Cancarb Limited Corporation Canada)

Ex 8: Same as Ex 7 except include 4 pph of the carbon black as the infrared attenuator.

Ex 9: same as Ex 7 except include 3 pph of the carbon black and 0.5 pph of graphite (UF 198C from Graphit Kropfmuehl Ag) as the infrared attenuator.

Ex 10: same as Ex 9 except include 1 pph of the carbon black and 1.5 pph of the graphite as the infrared attenuator.

Ex 11: same as Ex 7, except include 2 pph of graphite (TIMREX™ GA 98/10, TIMREX is a trademark of Timcal SA Corporation) as the infrared attenuator.

Foam properties, including dimensional integrity testing results, are in Table 6 with those of Comp Ex E.

Ex 7-11 illustrate the surprising increase in dimensional stability upon inclusion of an infrared attenuating agent in polymer foams containing as little as 4.1 wt % acrylonitrile (AN).

What is claimed is:

1. A polymer foam comprising a polymer composition having cells defined therein, the polymer composition containing styrene acrylonitrile polymer and an infrared attenuating agent wherein the amount of polymerized acrylonitrile in the polymer composition is one weight-percent or more based on polymer composition weight, wherein the polymer foam is an extruded polymer foam that is free from having a network of bead skins characteristic of an expanded bead foam, and wherein the infrared attenuating agent is selected from carbon black and graphite and is present at a concentration of one weight-percent or more and five weight-percent or less based on total polymer weight in the polymer foam and wherein the total amount of acrylonitrile component in the styrene acrylonitrile copolymer is more than four weight-percent of the total weight of all polymers in the polymer composition.

2. The foam of claim 1, wherein the infrared attenuating agent is a carbon black.

3. The foam of claim 1, wherein the foam has an open cell content of less than 30% according to ASTM method D6226-05.

4. The foam of claim 1, wherein the amount of acrylonitrile in the polymer composition is fifty weight-percent or less based on polymer composition weight.

5. The foam of claim 1, wherein the amount of acrylonitrile in the polymer composition is four to twenty weight-percent based on polymer composition weight.

6. The foam of claim 1, wherein the polymer composition contains a blend of styrene acrylonitrile and polystyrene.

7. The foam of claim 1, wherein the foam has density of 33 kilograms per cubic meter or less.

8. The polymer foam of claim 1, wherein all polymers in the polymer composition have a weight-averaged molecular weight of less than 1,000,000.

9. The polymer foam of claim 1, wherein the polymer foam has a thermal conductivity of 32 milliwatts per meter-Kelvin or less.

10. The polymer foam of claim 1, wherein the polymer foam has a vertical compressive strength of 100 kilopascals or more according to test method ISO 845-95.

11. The polymer foam of claim 1, wherein acrylonitrile is present in an amount of four weight-percent or more and twenty weight-percent or less and the infrared attenuating agent is selected from carbon black and graphite and is present at a concentration of one weight-percent or more and ten weight-percent or less, with weight-percents based on total polymer weight.

12. A process for preparing the polymer foam of claim 1, the process comprising forming a foamable composition containing a polymer composition containing styrene acrylonitrile copolymer and an infrared attenuating agent and expanding the foamable composition into a polymer foam, wherein the amount of polymerized acrylonitrile in the polymer composition is one weight-percent or more based on polymer composition weight and wherein the process is an extrusion process where the polymer composition experiences an extrusion pressure within an extruder and a pressure lower than the extrusion pressure upon extruding from the extruder and where expansion of the foamable composition occurs upon extruding the foamable composition from the extruder, and wherein the infrared attenuating agent is selected from carbon black and graphite and is present at a concentration of one weight-percent or more and five weight-percent or less based on total polymer weight in the polymer foam and wherein the total amount of acrylonitrile component in the styrene acrylonitrile copolymer is more than four weight-percent of the total weight of all polymers in the polymer composition.

13. The process of claim 12, wherein the infrared attenuating agent is a carbon black.

14. The process of claim 12, wherein the amount of acrylonitrile is fifty weight-percent or less, with weight-percent based on total polymer composition weight.

15. The process of claim 12, wherein the foamable composition comprises a blowing agent containing carbon dioxide.

16. The process of claim 12, wherein the foamable composition comprises a blowing agent containing water.

17. A method of using the polymer foam of claim 1, the method comprising placing the polymer foam between two areas that can differ in temperature.

* * * * *